United States Patent
Ramani et al.

(10) Patent No.: US 11,297,501 B2
(45) Date of Patent: Apr. 5, 2022

(54) FIREWALL DISCOVERY AND MANAGEMENT

(71) Applicant: salesforce.com, inc., San Francisco, CA (US)

(72) Inventors: Ramesh Ramani, San Francisco, CA (US); Anurag Bhatt, Brampton (CA)

(73) Assignee: SALESFORCE.COM, INC., San Francisco, CA (US)

( * ) Notice: Subject to any disclaimer, the term of this patent is extended or adjusted under 35 U.S.C. 154(b) by 32 days.

(21) Appl. No.: 16/779,226

(22) Filed: Jan. 31, 2020

(65) Prior Publication Data

US 2021/0243605 A1    Aug. 5, 2021

(51) Int. Cl.
*H04W 12/088* (2021.01)
*G06F 12/0804* (2016.01)
*H04W 12/06* (2021.01)
*H04W 12/71* (2021.01)

(52) U.S. Cl.
CPC ...... *H04W 12/088* (2021.01); *G06F 12/0804* (2013.01); *H04W 12/06* (2013.01); *H04W 12/71* (2021.01); *G06F 2212/601* (2013.01)

(58) Field of Classification Search
CPC ... H04W 12/088; H04W 12/71; H04W 12/06; G06F 2212/601
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |

(Continued)

OTHER PUBLICATIONS

"Google Plus Users", Google+Ripples; Oct. 31, 2011; 3 pages.

*Primary Examiner* — Viral S Lakhia

(74) *Attorney, Agent, or Firm* — Schwabe Williamson & Wyatt

(57) ABSTRACT

Updating firewalls can be difficult if many devices need to be manually reconfigured. To assist, vendors provide management tools. If the tool requires manual adding/deleting known firewalls, this is problematic in networks with many devices. If devices are hosted within a virtual private cloud, the tool may adopt a centralized "star" configuration and maintain live contact with all firewalls. This exposes firewalls to risk if the central tool is compromised. An alternative to a central tool is to implement a tool local to an environment, secure the tool with multi-level authentication, and provide automatic active firewall discovery, e.g., automate adding/deleting firewalls in an environment defined with respect to criteria that may be used to define a collection of active firewalls. Configuration changes may be pushed to the collection. Authentication credentials to access the firewalls are ephemerally cached and flushed after use so the tool cannot be compromised.

20 Claims, 6 Drawing Sheets

(56) References Cited

U.S. PATENT DOCUMENTS

| | | |
|---|---|---|
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatteqee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,058,274 B2 * | 6/2015 | Samanta ............ G06F 12/0897 |
| 9,992,186 B1 * | 6/2018 | Drozd ................. H04L 63/0807 |
| 10,009,337 B1 * | 6/2018 | Fischer ............... H04L 67/1097 |
| 10,216,949 B1 * | 2/2019 | McKelvie ........... G06F 21/6218 |
| 10,447,728 B1 * | 10/2019 | Steinberg ................ H04L 63/20 |
| 10,469,457 B1 * | 11/2019 | Sokolov ................ H04L 9/085 |
| 10,680,814 B2 * | 6/2020 | Bone ...................... H04L 9/0891 |
| 10,924,347 B1 * | 2/2021 | Narsian ................ H04L 41/0853 |
| 11,030,120 B2 * | 6/2021 | Zmudzinski ........ G06F 12/0891 |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |

(56) References Cited

U.S. PATENT DOCUMENTS

| | | |
|---|---|---|
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 | 10/2011 | Bulumulla |
| 2012/0042218 A1 | 2/2012 | Cinarkaya |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya |
| 2014/0359537 A1 | 12/2014 | Jackobson et al. |
| 2015/0081876 A1* | 3/2015 | Pieczul .................. H04L 67/22 709/224 |
| 2017/0228182 A1* | 8/2017 | Novak .................... G06F 3/067 |
| 2017/0331802 A1* | 11/2017 | Keshava ............... H04L 9/0891 |
| 2017/0366547 A1* | 12/2017 | Goldfarb ............... H04L 63/102 |
| 2018/0041336 A1* | 2/2018 | Keshava ................ G06F 21/33 |
| 2019/0394042 A1* | 12/2019 | Peddada ............. H04W 12/069 |
| 2020/0153831 A1* | 5/2020 | Baer ....................... H04L 63/10 |

* cited by examiner

FIREWALL DISCOVERY AND MANAGEMENT

TECHNICAL FIELD

The present invention relates generally to computing systems, and more particularly to automated discovery of active firewalls and management thereof using ephemeral authentication credentials.

BACKGROUND

A large-scale cloud-based computer system may include multiple datacenters at various geographic locations to maintain millions of sets of application data for millions of organizations as well as provide millions of sets of application services such as those for customer relationship management, secured data access, online transaction processing, mobile apps, etc., to respective users and/or customers of these organizations. As datacenters grow, evolve and interconnect over time, and as computing resource needs for the organizations evolve over time, networks interconnecting devices continue to grow ever larger and more complex. In current network environments there may be many thousands of interconnected devices, such as client devices, servers, hubs, switches, routers, etc. Some of these devices may be internal to a network and others may be external. The concept of what is a "network" has evolved over time, and does not simply refer to, for example, a company's private network interconnecting the company's data centers, servers, clients, and other hardware/software. As will be discussed further below, a company's internal network may be, for example, a virtual private network defined within networking constructs provided by another entity.

Since the devices may be wired and wirelessly connected and be located anywhere in the world (or outside of it), it will be appreciated the concept of "internal" is generally used to refer to devices that are under some sort of common control or separation from other devices, e.g., devices on an intranet or other collection of private networks. Ingress and egress to an internal network may be managed by firewalls positioned at network edges or perimeters and are configured to monitor data traffic originating external to the network; if the traffic is deemed safe (i.e., trusted), it is allowed to progress through the firewall onto the internal network. Modern firewalls include an operating system (OS) and tools to provide analytics to help identify and stop suspicious data traffic.

Unfortunately a firewall is not a set-it and forget-it type of device. Instead they need to be actively managed and maintained. In a large network environment, many firewalls are used so as to balance access to the internal network, and this necessarily makes managing all of the firewalls a complex task. Typically a firewall may be accessed (with appropriate access credentials) and configured with a desired security configuration. A configuration such as rules and/or IP tables may be used to control the flow of traffic into and/or out of a network (e.g., from a perimeter of the network, such as a private network, and another network, such as the Internet or other public network). The configuration may be configured using a series of commands, and may be utilized by perimeter device (e.g., a hardware firewall device). This may be referred to as "network-based" firewalls. If there are many firewalls, manually updating them is impractical. To address this problem, firewall vendors may provide a management tool to facilitate firewall management. For example, the firewall vendor may provide an Amazon Elastic Compute tool (EC2 tool) that operates as a virtual or physical appliance in the EC2. After manually inputting firewall identification and authentication information into the EC2 tool, the EC2 tool may then operate as a central management point (e.g., a star topology) reaching out to and maintaining active connections with the manually configured firewalls.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1A:
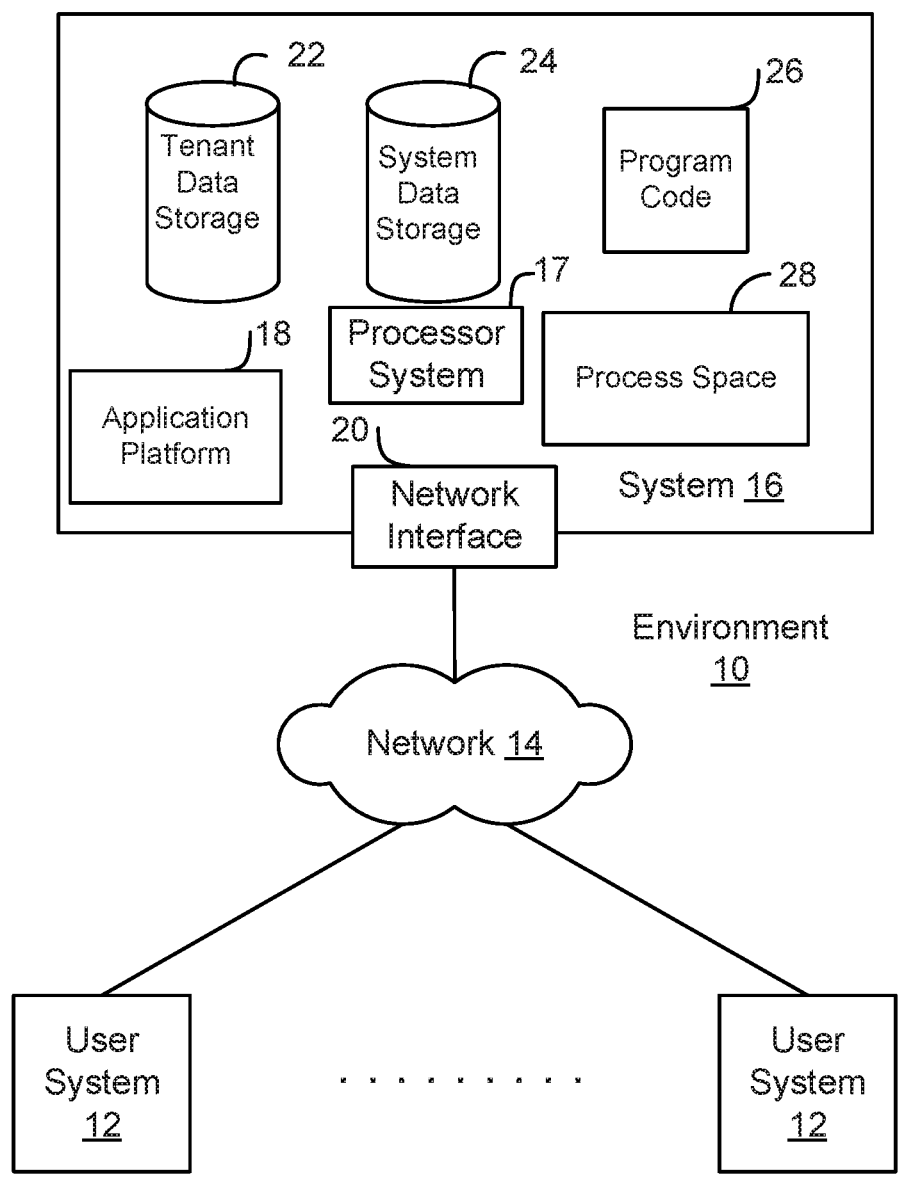
FIG. 1A shows a block diagram of an example environment in which an on-demand database service can be used according to some implementations.

The following detailed description discusses multiple exemplary embodiments for more efficiently managing devices, such as firewalls used to protect an organization. It will be appreciated while various alternatives are disclosed, they are approaches that may be pursued, but none are approaches that necessarily must be used. In addition, while issues with solutions may be identified with respect to one or more exemplary approaches described herein, none should be assumed to have been recognized in any prior art on the basis of being identified as a known issue. In this description, for the purposes of explanation, numerous specific details are set forth in order to provide a thorough understanding of the present invention. It will be apparent, however, the present invention may be practiced without these specific details. In other instances, well-known structures and devices are not described in exhaustive detail, in order to avoid unnecessarily occluding, obscuring, or obfuscating the present invention.

Examples of systems, apparatus, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

The following is a brief overview of selected features of various embodiments. This overview is not an extensive summary of the invention or claimed embodiments, is not intended to identify particularly significant aspects of disclosed embodiments, and does not delineate any particular scope of the invention. This overview merely presents some concepts that may facilitate, in a condensed and simplified format, understanding more detailed description below and appreciate the breadth of the claimed embodiments.

An EC2 type of device management tool, such as provided to facilitate managing firewalls, requires manual input in the tool of firewall information and credentials, and manual removal for a disabled or broken firewall. If there are many firewalls, and large network environments may have thousands of firewalls protecting access to many devices and/or other network environments (e.g., interconnected private networks), collectively referred to as "internal" destinations, by restricting access from "external" sources (e.g., devices and/or networks such as public networks including the Internet) that are not part of the "internal" network. Any manual operation represents a significant burden. Also, employing a star topology presents a single point of failure risk, and hence a single source security risk affecting all firewalls. If the EC2 tool or its host environment are compromised, and the tool is maintaining active connections to all firewalls, compromising the tool or host environment may lead to all firewalls being maliciously manipulated, data theft, loss, or worse.

Since the devices may be wired and wirelessly connected and be located anywhere in the world (or outside of it), it will be appreciated the concept of "internal" is generally used to refer to devices that are under some sort of common control or separation from other devices, e.g., devices on an intranet or other collection of private networks. Ingress and egress to the internal network may be managed by firewalls that may, for example, be positioned at network edges (or perimeters) and configured to monitor data traffic originating "external" to the network. If the traffic is deemed safe (e.g., trusted), it is allowed to progress through the firewall onto the internal network. An exemplary firewall which may be used to protect internal resources is a firewall provided by Palo Alto Networks, which provides firewalls that include an OS and analytics tools to help identify problematic network traffic and identify potentially dangerous data source and/or destination information, such as by data packet inspection and higher-level protocol inspection, e.g., evaluating Uniform Resource Locator (URL) information.

To ensure firewalls are configured properly they need to be actively managed. To manage a firewall, it needs to be accessed with appropriate access credentials, and then may be configured or reconfigured. But individual access is impractical in environments with more than a few firewalls. To assist with managing firewalls, Palo Alto Networks and other vendor firewalls provide a tool, such as the Palo Alto Networks "Panorama" tool. Other tool examples include Cisco Defense Orchestrator, Cisco Firepower Management Center, ManageEngine Firewall Analyzer, etc. (All referenced marks are the property of their respective owners.) The phrase "management tool" will be used to generally refer various possibilities for presenting the tool, including as a specific purpose device(s) implementing the tool, as a general purpose device(s) implementing the tool, or some combination thereof. Note use of "(s)" herein and the claims that follow, such as in "device(s)" or "credential(s)" is to convey there may be one or more. Regarding specific and general purpose devices see also the FIG. 6 discussion.

Figure 2:
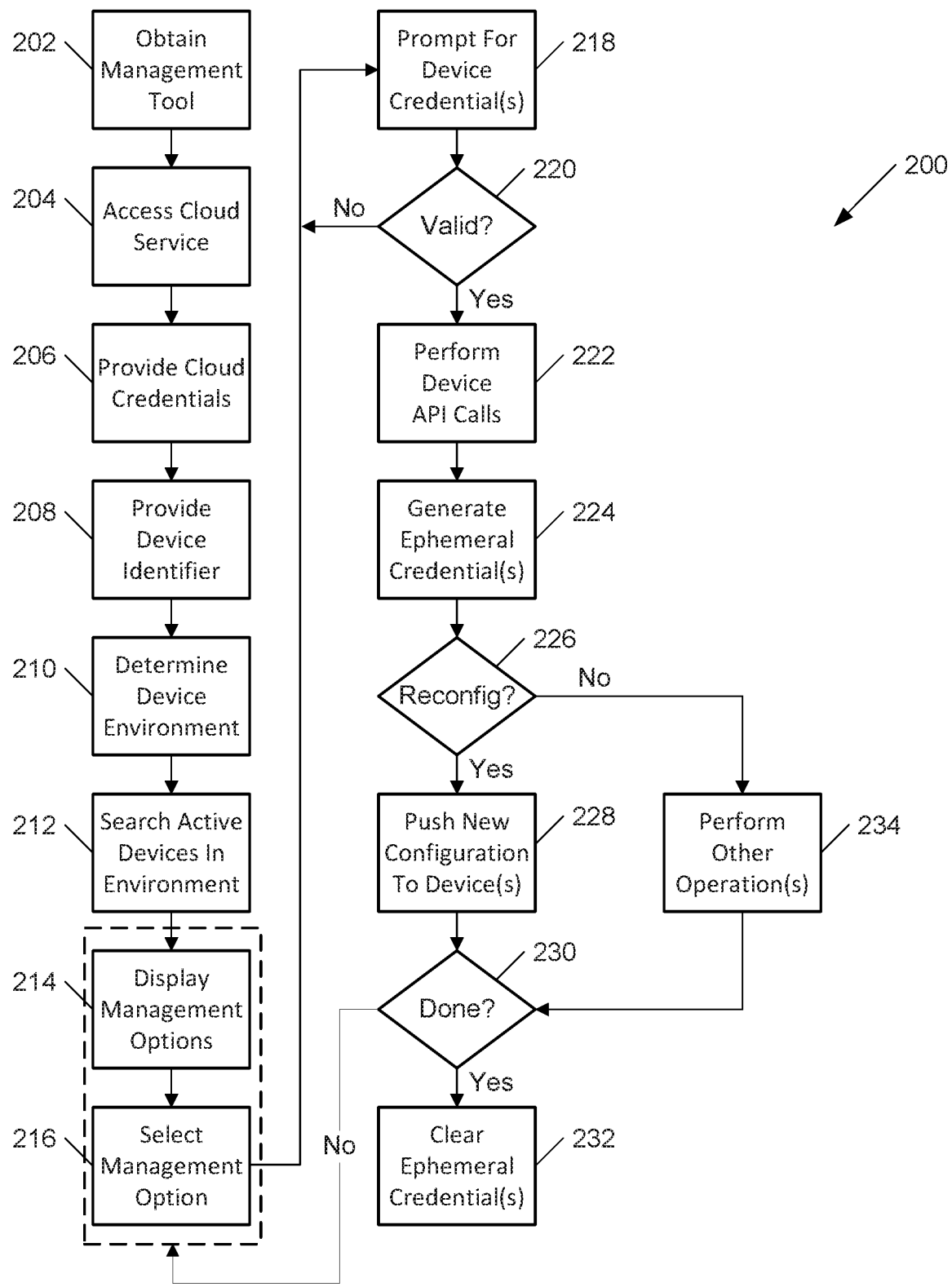
FIG. 2 illustrates an exemplary flowchart, according to one embodiment, for managing devices.

It is expected the reader is familiar tools such as Panorama that operate as a virtual or physical appliance in the cloud, such as the Amazon® Elastic Compute Cloud° (EC2®) (see, e.g., FIG. 2). Panorama requires an EC2 instance (and license purchase) from the tool provider, and operates in a star configuration, i.e., operating as a central hub reaching out to and maintaining active configuration connections with all firewalls to be managed. Unfortunately, if Panorama is compromised, all managed firewalls are at risk. Additionally, Panorama and tools like Panorama need to be manually configured when adding or deleting firewalls from its configuration. For example, one must manually log into Panorama and individually enter one or more credential for the firewall (e.g., the serial number or other identifier used to identify a firewall to be managed by Panorama), and then log into the firewall to be managed and associate the Internet Protocol (IP) address or other network identifier of the Panorama tool (or of a machine hosting Panorama) that is to manage the firewall. It will be appreciated in other embodiments, other information, such as cryptographic access key(s), may be used to identify management tools and/or firewalls to be managed. Although firewall management may be facilitated with the tool, just the adding and removing firewalls may be prohibitively very time consuming if there are many firewalls.

In various embodiments disclosed below, an alternate approach to a centralized security management tool such as Panorama, and the like, is a new portable management tool that may be implemented on a device located locally (e.g., logically or physically on an internal environment such as a network), and secure to use (e.g., has operator authentication). And, rather than requiring manual add/delete operations in tools such as Panorama, instead the new tool, as will be discussed further below, will automatically discover active firewalls in an environment based on a criteria that may be used to automatically define a collection of firewalls (or other devices to be managed) and push configuration changes to the collection of discovered firewalls or other devices. The new tool may also operate as a single view on all logs or other data associated with the collection of firewalls, and may be used to find policies, rules, objects, tags (used to define a grouping of devices), groups (one or more devices sharing a characteristic defined with respect to a network tag or other annotation/data associated with a device), etc. relating to the collection of firewalls. In various embodiments, the tool may provide many features and functions, including device (e.g., firewall or other device) Discovery, Add, Modify, Delete, Disable, Enable, Find, List, Load, Log, Reconfigure, Status, View, etc.

FIG. 1A shows a block diagram of an example of an environment 10 in which a management tool, such as one operating on a laptop, may be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol. It will be appreciated portions of the FIGS. 2-5 embodiments may be practiced within network 14, e.g., the FIG. 3 cloud service 352 may be at least in part within network 14, and some or all of the FIG. 3 network(s) 338 may be part of network 14.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead. It will be appreciated portions of the FIGS. 2-5 embodiments may be practiced in conjunction with the network interface 20, e.g., the network interface may be part of or communicatively coupled with firewalls such as FIG. 3 firewalls 314-336 and operate in accord with the FIGS. 2, 4 and 5.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network (See also FIG. 6). The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations"). In one embodiment, the management tool may be disposed in a device 342 (see e.g., FIG. 3) having some or all of the features discussed herein with respect to the user system 12.

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
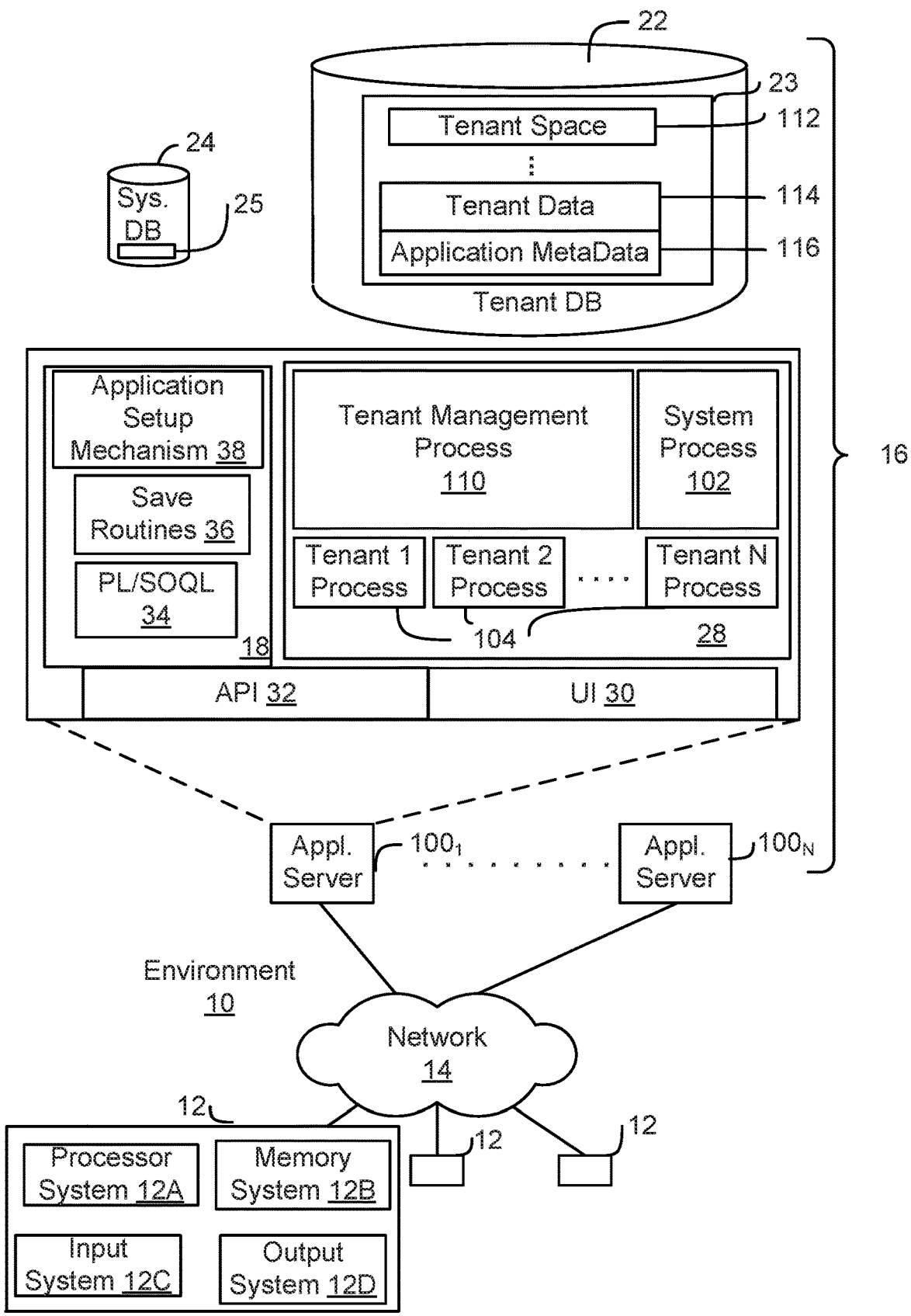
FIG. 1B shows a block diagram of example implementations of elements of FIG. 1A and example interconnections between these elements according to some implementations.

FIG. 1B shows a block diagram of example implementations of elements of FIG. 1A and example interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers 1001-100N. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 112, which can be physically or logically arranged or divided. Within each tenant storage space 112, user storage 114 and application metadata 116 can similarly be allocated for each user. For example, a copy of a user's most recently used (MRU) items can be stored to user storage 114. Similarly, a copy of MRU items for an entire organization that is a tenant can be stored to tenant storage space 112.

The process space 28 includes system process space 102, individual tenant process spaces 104 and a tenant management process space 110. The application platform 18 includes an application setup mechanism 38 that supports application developers' creation and management of applications. Such applications and others can be saved as metadata into tenant database 22 by save routines 36 for execution by subscribers as one or more tenant process spaces 104 managed by tenant management process 110, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 116 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server 1001 can be coupled via the network 14 (for example, the Internet), another application server 100N-1 can be coupled via a direct network link, and another application server 100N can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of a MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

FIG. 2 illustrates an exemplary flowchart 200, according to one embodiment, for managing devices. It will be appreciated the operations and techniques are applicable to any devices that may be managed as discussed herein, however some embodiments will focus on devices that operate as a firewall, or like a firewall, e.g., operating to inspect information passing by and/or through the device and possibly making security decisions relating to the information. In various embodiments, it will be appreciated the device may be communicatively coupled with one or more networks, and/or other communication mediums, and the networks may be public, private and/or a combination of the two. For example, a network may include a node/machine on the Internet (public network), and/or be within an intranet (private network) or other private communication medium. In some embodiments, a "private" network may be defined within a public and/or private network(s), e.g., it may be defined as a virtual private cloud (VPC) in association with network resources provided by a cloud service.

Examples of cloud service providers include, by way of example only and not as limitations inferred from perceived differences in cloud services and/or infrastructure, include Amazon Virtual Private Cloud (Amazon VPC), Amazon Elastic Compute Cloud (EC2), Microsoft Azure (e.g., Hybrid cloud), Google Cloud, Alibaba Cloud, IBM's cloud services, Oracle cloud services, etc. It will be appreciated these and other cloud services and cloud infrastructure vendors provide on-demand and configurable shared computing resources allocated from one or more public and/or private cloud environments, and may provide virtual private environments isolated from other environments/customers having their own associated resources. Various hardware and/or software techniques may be used to establish private environments, such as by allocating private address spaces, e.g., Internet Protocol (IP) subnets, providing private virtual communication interfaces, e.g., virtual Local Area Networks (VLANs), virtual private networks (VPNs) to securely control access to virtual private environments. See, e.g., FIG. 3 which discusses creating a private environment within another network such as the Internet. For convenience, assume the cloud service is compatible with the well-known Amazon AWS/EC2 services, and the devices being managed, while not required to be a firewall, are assumed to be operationally compatible with the Palo Alto Networks managed firewalls.

In some embodiments, it is assumed private networks, virtual private environments, or the like, use Palo Alto Networks (PAN) Firewalls (FWs) or equivalent type devices as security devices to protecting access to restricted resources. In some embodiments, the Amazon Web Services (AWS) platform may be used to implement a private environment shielded by the PAN firewalls where a management tool may be used to access and/or configure the firewalls. However, unlike the Panorama or equivalent type of centralized (hub and spoke configuration) management tool that, if compromised, leaves all devices at risk, instead a local management tool may be used. The term "local" refers to using a tool considered located on an internal network, where "internal" may be considered as referring to destinations and/or resources on a private network and/or a private environment.

In the illustrated embodiment, one operation is to obtain 202 a copy of the management tool. It will be appreciated aspects of disclosed embodiments may be performed by a dedicated computing device, e.g., a device operating under control of an application specific integrated circuit (ASIC), programmable gate array (PGA), field PGA (FPGA), or other fixed and/or programmable circuitry, or a general purpose computing device (e.g., a laptop). The management tool therefore may be firmware or other information required to configure a dedicated computing device, or it may be presented as software that may be executed on the general purpose computing device, or it could be a combination of both, e.g., a device having some specific device functionality that may also process software. See also the FIGS. 1 user device 12 discussion.

Once the software has been obtained, a cloud service may be accessed 204. In the illustrated embodiment, for security, a credential(s) is provided 206 to authenticate use of the management tool (and/or the device implementing management tool) with the cloud service. It will be appreciated any manner of cryptographic environment may be used to authenticate, such as sharing a known pre-shared key and/or certificate, entering a username and password, public key cryptography (PKC), International Telecommunications Union (ITU) X.509, public key infrastructure (PKI), etc. Assuming authentication is successful, a device identifier may be provided 208. In one embodiment, the device(s) to be managed are assumed to be grouped according to some characteristic. For example, one could decide to manage all devices sharing the same network tag, or based on a particular region/portion of a network, and thus use a network address or network address mask to identify specific devices. In one embodiment the provided 208 identifier is the IP address of a device.

With the provided identifier, the device's environment may be determined 210. For example, if we assume identifiers are IPv4 network addresses, if the provided 208 identifier was 10.10.10.10, we can determine the device environment to be the 10.0.0.0/24 address space. It will be appreciated determined environment will vary based on the type of identifier that is provided. In this example, we can assume a subsequent operation is to search 212 for active devices (to be managed) in the determined 210 environment. Typically, a management tool (such as the "Panorama" and similar such tools discussed above) requires devices to be managed be manually added and removed from the software. This can be a tedious and error prone task if there are many devices to be managed. In contrast to that type of system, in this illustrated embodiment, rather than rely on pre-existing device lists, instead the search 212 performs a new identification of all devices that are currently active. Thus, if a device is missing, broken/non-responsive, or intentionally disabled, the search will skip over those devices. There is no need in the illustrated embodiments to manually add or remove devices.

Once the active devices are identified, then management options may be displayed 214. It will be appreciated the term "display" corresponds to whatever format of output is needed to present operation choices to the management tool. For example if an Artificial Intelligence (AI) Engine (see, e.g., FIG. 6 item 644) is interfacing with the management tool, then the "display" will correspond to appropriate signals and/or data output for processing by the AI. Alternatively, if the management tool is operating in a device to be used by, for example, a sight impaired user, the "display" would correspond to providing a tactile output, e.g., Braille, and/or an audible output, to indicate operations of the management tool. As discussed above, a management tool may provide various features and/or functions, such as Discovery, Add, Modify, Delete, Disable, Enable, Find, List, Load, Log, Reconfigure, Status, View, etc. to facilitate viewing, accessing and/or modifying any of a device's characteristics and/or operating features. It will be appreciated some options, such as device Status may not require elevated authority to choose 216 a particular option. For example, the device status may be deemed public information that may be accessed without any authentication.

For other operations requiring authorization, such as a reconfiguration, there may be a prompt 218 for a device credential(s) to access restricted operations and/or restricted device resources. As with the display 214 operation discussed above, the prompt may be an operation that varies according to the nature of the device operating the management tool. What constitutes valid Input/Output (I/O) may vary. And as with providing 206 cloud credentials, any of the known cryptographic operations discussed above, as well as other known authentication schemes may be used to authenticate permission to perform the selected 216 management option. In one embodiment, it is assumed devices require a username and password in response to the prompt for a device credential(s). For expository convenience, it is assumed devices to be managed may share authentication credential(s) to access the devices. In another embodiment there may be different credentials for different devices and that the prompt for device credential(s) may be repeated (not illustrated) for other devices if and as needed. If 220 the supplied credential(s) is not valid, then processing may loop back to prompting for the credential(s). It will be appreciated the illustrated operations are an over-simplification of program operation and other processes and/or checks and/or other operations may be performed instead of a simple loop-back.

If 220 the credential(s) is valid, then in one embodiment the management tool may access the device though one or more calls 222 to an Application Programming Interface (API) associated with the device. The API may be a public and/or private interface providing access to functions and/or features of devices. For example, the API may be used to Modify a device to reconfigure it to perform differently. After authenticating with the device to show the management tool is authorized to interact with the device, one or more API calls may be made to generate 224 an ephemeral credential(s). Ephemeral credentials are intended to be stored in a volatile storage of some sort, such as within device memory, where the memory may be released (e.g., cleared, flushed, securely erased, etc.) after need for them ends. For example, they can be stored in device memory and released after completion of managing devices associated with the credential(s), or when the management tool is exited or shutdown.

As discussed the management tool may support an arbitrary set of operations that may be exposed by an API to facilitate managing the device. It will be appreciated the API may be standardized as well defined to be extensible so in future new features may be implemented by the devices and incorporated into the API. The API may include functions such as version information and function list to provide information about what the API is capable of performing. And it will be appreciated an API may provide one function that utilizes one or more functions provided by a device, or the converse may occur, where multiple API calls access one device feature or function. It will be further understood an API may also aggregate multiple devices into a logical device, and the logical device may have features and capability not provided by any of the individual devices in the aggregation. For example, in a group of two devices, a first one may communicate using one protocol incompatible with the management tool, and a second one may support communication with the management tool, and the API for the second device may support aggregating and communication on behalf of the first devices. In such fashion the lifespan of older devices may be extended, at least temporarily, until they may be upgrade or replaced with a newer device.

In the illustrated embodiment, the ephemeral credential(s) may be received directly from the device to be managed, however in another embodiment the credential(s) may be indirectly retrieved from another source if authorized by the device, e.g., the device may authorize retrieving credentials from the cloud service on behalf of the device. Device credential(s) or other identification information is not saved in the management tool, thus alleviating risk inherent to Panorama and other such centralized management tools being compromised and giving access to all managed devices. By accessing 204 the cloud service with one credential(s) and accessing 218 the device with another credential(s), we get a safer multi-stage authentication process than provided by conventional management tools.

The selected 216 management option may then be processed. For example, if 226 the choice was to reconfigure the device, a new configuration may be pushed 228 to the device(s). Not illustrated are operations relating to determining the new configuration to be pushed to the device. A new configuration may be created in a variety of ways, including manually entering device configuration changes in the tool, uploading a configuration from an external source, e.g., an internal network location or retrieving from a server, retrieving from an internal memory that has received and stored the new configuration, applying a "smart" rule, e.g., an intelligent or Al (see, e.g., FIG. 6 items 640-644) based procedure that looks at the device and updates the device according to the rule, etc. The push may be made to one device or multiple devices, e.g., it may be pushed to all compatible devices located from the search 212 of the active environment. Although not illustrated, as noted above, if all devices do not share the same ephemeral credential(s), the various applicable ephemeral credential(s) may be provided to the relevant device(s) to perform the desired reconfiguration.

If 230 management of the device(s) is done/complete, then the ephemeral credential(s) may be cleared 232. If 230 not done, then for example, processing may loop back to performing displaying 214 and selecting 216 a different management option to perform. In one embodiment, the displaying 214 management options may dynamically change what may be performed if, for example, a previous operation makes different choices available or unavailable due to the previous choices. It will be also be appreciated illustrated embodiments simplify operations that may be performed and related operational flow. And, if 226 the selected management option was not reconfiguration, then other operation(s) may be performed 234 (including providing 208 a new identifier and starting a new search 212 for different devices to manage), and a test made to determine if 230 management is done.

Figure 3:
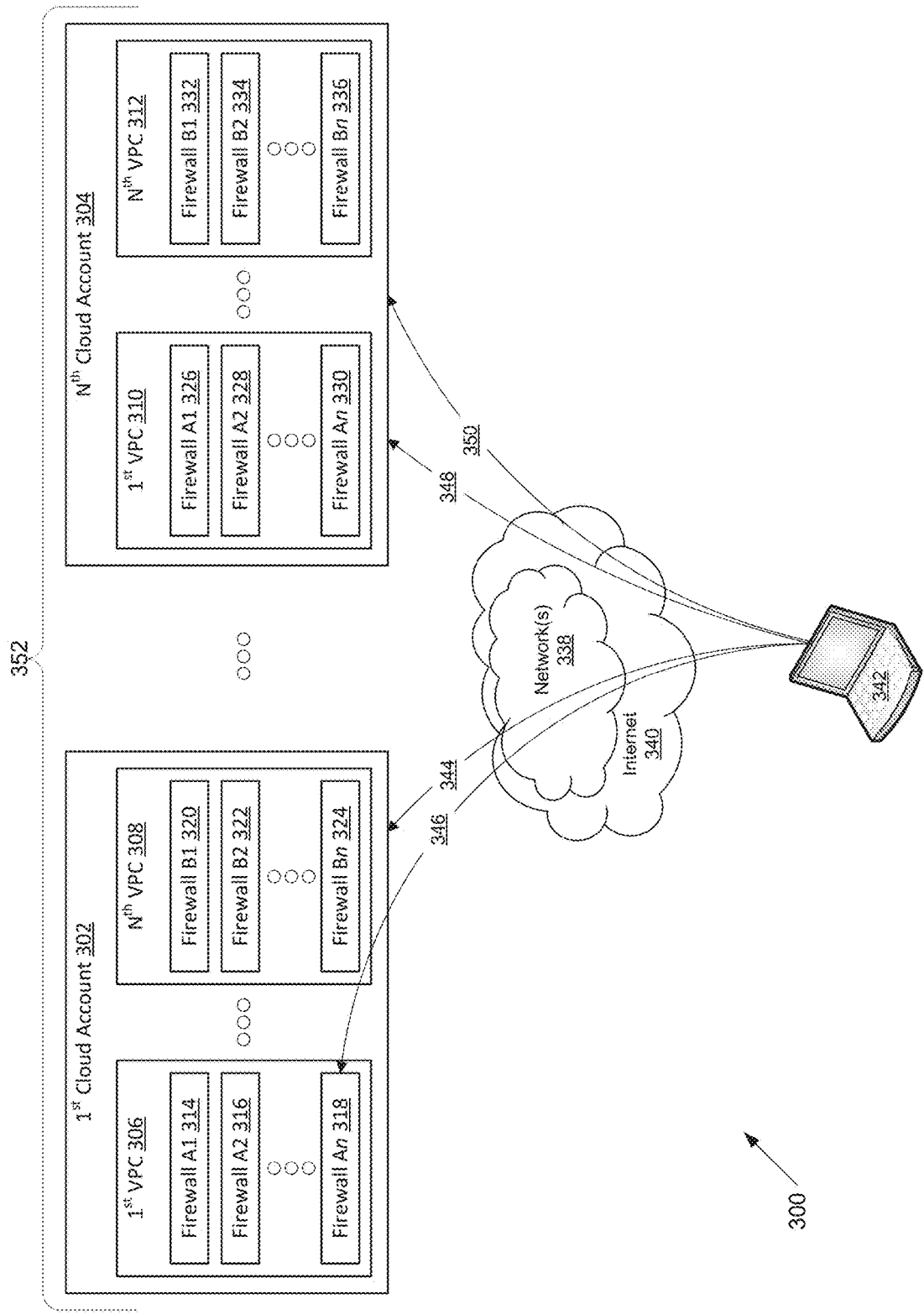
FIG. 3 illustrates a system according to one embodiment.

FIG. 3 illustrates a system 300 according to one embodiment. As discussed above with respect to FIG. 2, a cloud service may be accessed 204 to assist with searching 212 for devices to manage in an environment, and an ephemeral credential(s) is generated 224 to allow managing the devices found in the environment. As illustrated, there may be one or more cloud service 352 having associated first 302 and second 304 cloud accounts. For expository convenience we assume the cloud service(s) is Amazon Web Service (AWS) compatible, and providing Amazon Elastic Compute Cloud (EC2) environments. Shown are one or more cloud accounts (e.g., accounts 1 302 though N 304, each having one or more associated Virtual Private Cloud (VPC) 306-312 (e.g., VPCs 1 306, 308 through N 310, 312). Each VPC has multiple associated Firewalls 314-336, and it is assumed one VPC 306 represents a private environment separate from environments 308-312 provided by other VPCs. Thus, for example, assume FIG. 2 relates to accessing the first VPC 306 and the search 212 identifies each of the firewalls 314-318 based on searching against an IP address of one of the firewalls 314-318 in the VPC.

It is understood the VPC may be implemented by the cloud service on a private network 338 and/or public network 340. The underlying network does not matter so long as a private network environment, sometimes called an "intercloud", is define such that it includes machines within a perimeter, where the perimeter separates items internal to a particular private environment from items external to that private environment. For example, each VPC 306-312 has its own associated private environment, perimeter and machines (including firewalls 314-316) inside the private environment. It will be appreciated some or all firewalls 314-336 may be considered to be a gateway or pathway through the perimeter, where the firewalls have interfaces, communication ports, or the like facing both inward toward machines internal to a private environment, as well as facing external, such as to receive connections from the Internet 340. One skilled in the art understands how various VPC environments may be defined, such as to define private environments with respect to networks 338 that may be accessed by way of another network, such as the Internet 340. Although not illustrated as such, there could be multiple network clouds 338 each surrounding the illustrated VPCs 306-312 to which all may have a connection to the Internet 340 or other network to be used to access the various private environments associated with network(s) 338.

As illustrated a mobile computing device 342, such as a laptop computer, dedicated computing device, or other machine operates the management tool and accesses one of the cloud accounts 302-304, for example, the first cloud account 302 as illustrated by pathway 344. It will be appreciated the mobile device may be configured like the FIGS. 1 user device 12. As discussed with respect to FIG. 2 the management tool may authenticate (as needed) to the cloud account to search 212 for and identify, for example, active firewalls within the first VPC 306. If Firewall A2 316 were removed, disabled, or otherwise unable to respond to a search 212, that device would not appear in the search results and the search would only return active firewalls, such as Firewalls A1 314 and An 318. The management tool may then manage each of the firewalls, such as shown by pathway 346 representing the management tool working on firewall An 318. It will be appreciated the management tool may access any of the cloud accounts 302-304, and thus later contact the $N^{th}$ cloud account 304, e.g., over pathway 348 to work on one or more firewall 326-336, e.g., Firewall A2 328 associated with the cloud account 304 by way of pathway 350. In one embodiment, communication from the mobile device 342 is "local" to the private environment, e.g., originating with the private environment defined within the network(s) 338.

It will be appreciated the mobile device 342 does not have to be physically local to the environment, e.g., directly attached to the network(s) 338 in which devices to be managed are physically and/or virtually located. In one embodiment, the mobile device 342 is located on a public network, such as the Internet 340, and the mobile device uses a Virtual Private Network (VPN) or other secure communication technology to create a communication pathway 348 with a cloud account, e.g., the illustrated $N^{th}$ cloud account 304, to gain access to the VPC and access and/or manage firewalls, e.g., firewalls B1-Bn 332-336 in the $N^{th}$ VPC 312 associated with the cloud account 304. By way of the secure communication pathway to the VPC, the firewall may be reached, such as to use Application Programming Interfaces (APIs) that expose features and/or functionality of a firewall, while also allowing the firewall to remain protected from general access from a public network. Communication with the cloud account, VPC and/or firewall(s) may be over wired and/or wireless pathways, for example, pathways 348, 350 or using other pathways (not illustrated); pathways 348, 350 may be the same pathway, or separate pathways.

Thus, once a management tool has obtained an appropriate access key, or token or the like from a cloud account 302, 304, the management tool may use a characteristic of one of devices to be managed to search a cloud account for other visible devices, e.g., active/enabled not inactive/disabled/ disconnected, associated with the cloud account and sharing the search characteristic. As discussed above, the characteristic may be the IP address of one firewall that may be used to identify a private environment (e.g., one or more of the VPCs 306-312). Note depending on the search, the defined environment need not be restricted to a single VPC. The identified firewalls in the private environment may be accessed after clearing subsequent multi-level authentication, e.g., prompting for a username/password, before proceeding with granting access to manage the one or more identified firewalls.

It will be appreciated the characteristic may be any criteria/discernable data about a device, such as a tag associated with the device, a certain manufacturer, a specific firmware version, a particular amount of memory, a specific network location, a particular role (e.g., operating as a firewall, gateway, router, server, client, etc.), providing a particular service (e.g., web server, proxy, database, sales, contact management, etc.), or the like. A private environment may then be defined with respect to devices that satisfy the search criteria. It will be appreciated in addition to multi-level authentication noted above, if the management tool is disposed within a portable device such as a laptop computer, the user of the mobile device may be tested for appropriate characteristics before being allowed to manage devices in the private environment. For example, a mobile device user may be required to belong to a particular Active Directory (AD) group, in addition to satisfying multi-level authentication, e.g., knowing a username/password or other requested security information. If the username/password is a second level authentication, then requiring certain AD credential(s) is a tertiary level.

Figures 4, 5:
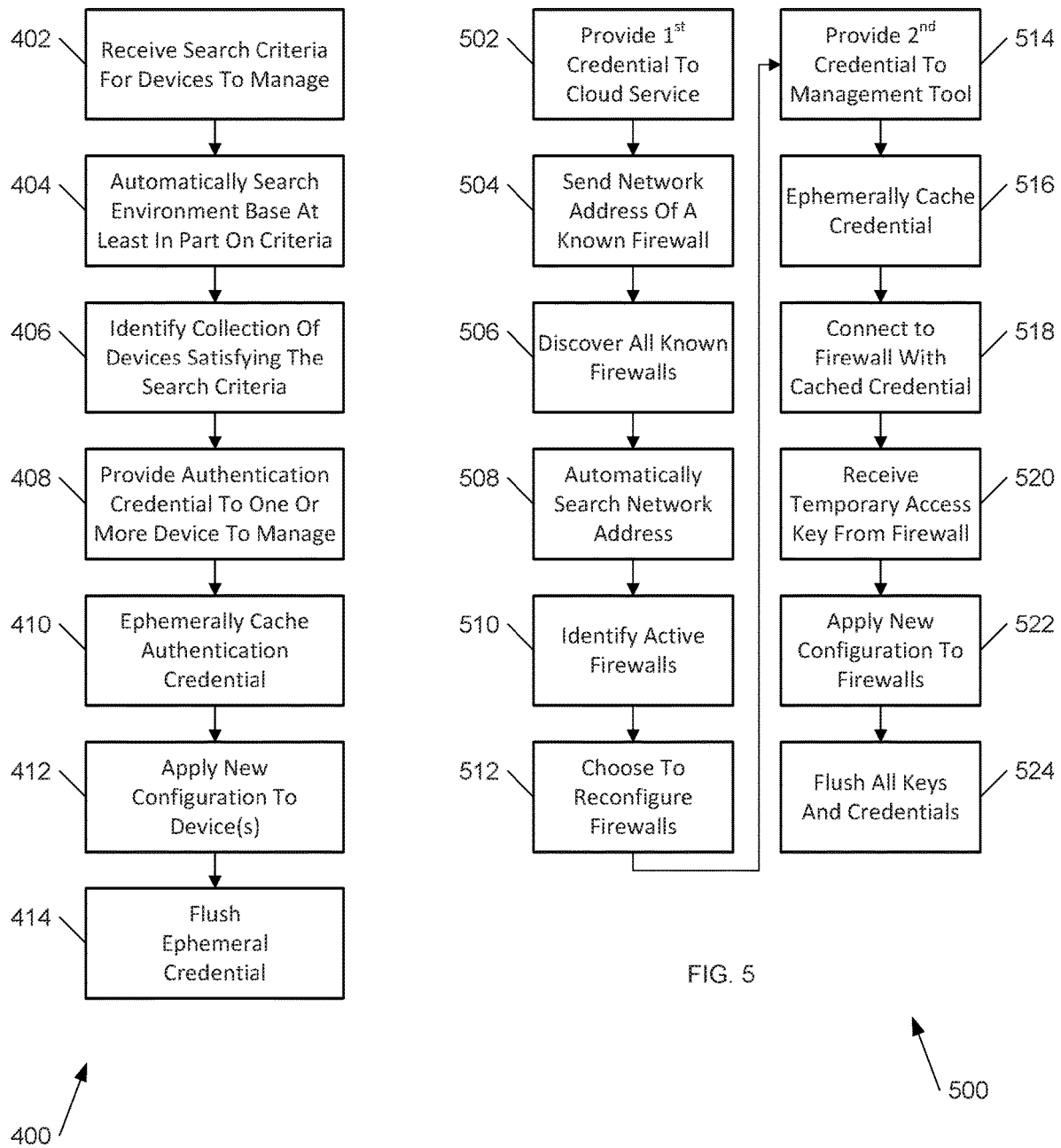
FIG. 4 illustrates an exemplary flowchart according to one embodiment for managing devices.
FIG. 5 illustrates an exemplary flowchart according to one embodiment for managing firewalls.

FIG. 4 illustrates an exemplary flowchart 400 according to one embodiment for managing devices. It will be appreciated the illustrated operations and techniques discussed are applicable to viewing, configuring, reconfiguring, upgrading, downgrading or any other operation, procedure or function that interfaces with and/or communicates with a device, which for at least the purposes of this figure, will be collectively referred to as "managing" the device. An initial operation may be to receive search criteria to identify devices to manage. The search criteria may be received 402 by an entity, such as a cloud service (see, e.g., FIG. 3 item 352), or other machine, device or service, which may search 404 its associated environment(s) (see, e.g., FIG. 3 items 302, 304) to identify 406 a collection of devices (see, e.g., FIG. 3 items 314-336) within its environment(s) satisfying the criteria. The collection of devices may be any known as well as newly discovered devices that meet the search criteria.

Although not illustrated, it will be appreciated the devices within the collection of devices may be managed individually or collectively, and either sequentially and/or in parallel. Thus for one or more of the devices, an authentication credential(s) may be provided 408 to the one or more device to manage. It will be appreciated for security, authentication tokens, keys, credentials, usernames, passwords, etc. may be required to be provided to the cloud service, and devices to be managed, before privileged/restricted information may be obtained, created or updated. Communication with devices does not need to be direct, other devices and/or entities may be involved in communication with a device to be managed, e.g., there may be intermediaries facilitating communication with a device where the intermediary itself requires authentication before facilitating. Security authentication may be different for the cloud service than what is used to access manageable devices. Manageable devices may share authentication credentials (such as a common username/password), or use different authentication.

In the illustrated embodiment, responsive to an authentication 408 to a device to be managed, an access authentication credential(s), e.g., an access key or token, may be received from the device and the access credential is ephemerally cached 410. For example, provided 408 authentication may be a username/password to log into a device to be managed, and responsive to the login an access key may be provided which may be used to manage that device going forward. The access key would be provided along with subsequent attempts to manage the device so the device knows the communication is authorized. In one embodiment, the device creates temporary access keys that have a limited lifespan. The terms "ephemeral", "ephemerally," and the like are used herein to denote access keys/token/etc. are not retained by a management tool or device implementing the management tool. Thus, for example, in one embodiment, after an initial authentication with a device, the device may return a token (or other data or identifier) that may be used by a tool to manage the device. If a management tool uses an API to access the device, in one embodiment some or all of the API calls may include the token (or other data) to validate API calls to the managed device. This results in the tool not having to remain logged in (or equivalent) to the device and when management is concluded, deleting the token prevents subsequent access to the device without re-authenticating 408.

Assuming a desire to reconfigure or otherwise change the configuration of a device, a new or updated configuration may be obtained or created anew with the management tool, and applied 412 to the device(s) in the collection of devices. As noted above, the management of devices may be individually performed, e.g., sequentially, or wholly or partially performed in parallel. Once management is complete, e.g., the tool is exited or otherwise shut down or the device running the management tool is shut down, put to sleep, left idle, etc., the ephemerally cached 410 credentials are flushed 414 to prevent risk of security compromise.

FIG. 5 illustrates an exemplary flowchart 500 according to one embodiment for managing firewalls. As discussed above with respect to FIGS. 2-4, various operations may be performed to locate the firewalls to manage, such as by contacting a virtual private cloud service which is responsible for providing an environment including devices, servers, etc. and an edge network protected by firewalls that restrict access to internal private resources of the environment from general access from a public network such as the Internet.

A first credential may be provided 502 to a cloud service, such as the Amazon AWS service providing EC2 virtual private cloud (EC2) services to define a private environment containing resources having access thereto protected by firewalls. It will be appreciated the credential may vary but for the AWS environment, the credential may be one or more AWS key for an AWS account. Assuming a management tool, which may be a specific purpose device or general purpose device programmed to provide the tool, is seeking to manage firewalls, the first credential authenticates the management tool to the cloud service. Once authenticated the management tool may interact with the cloud service. In the illustrated embodiment, an Application Programming Interface (API) is used to interact with the cloud service, including to provide the credential, and to perform operations such as to discover all firewalls associated with the cloud service. As illustrated, we can use the API to send 504 the cloud service the network address of a known firewall, or a tag associated with the firewall, and use that address or tag to search the cloud service to discover 506 all known firewalls, for example, on the same network as the network address of the known firewall, or sharing the same tag.

It will be appreciated the cloud service may know of more firewalls than are actually active/available for management. For example, some firewalls may be broken, disconnected, powered off, logically off (e.g., set to ignore network contact), or otherwise unavailable or unreachable. Therefore while we may discover 506 all known firewalls related to the network address of the known firewall, we next automatically search 508 the discovered firewalls to identify 510 all active firewalls, e.g., firewalls that are available to be managed. The management tool may then provide options available to manage discovered active firewalls, to which we can assume for the purposes of this discussion a user chooses 512 to reconfigure one or more firewall. Assuming the firewalls all use the same access credential (e.g., a login or other access credential), in one embodiment, the user of the management tool may provide 514 the management tool with a second credential to authenticate with the firewall. The second credential may be ephemerally cached 516 and used to connect 518 to each of the active firewall to be reconfigured.

After the management tool successfully authenticates with a firewall, the management tool may receive 520 a temporary access key, token or other data from the firewall to be used in API calls made to the firewall to manage the firewall. In one embodiment multiple firewalls may be configured to at least temporarily share the same temporary access key provided responsive to the second credential, e.g., so that API calls to access any of the available firewalls may provide the same temporary access key. In another embodiment, each firewall provides a different temporary access key responsive to the providing 514 the second credential. Thus, the management tool is then authorized to apply 522 a new configuration to the firewalls. Once management of the active firewalls is completed, the management tool may be exited, e.g., logged out, shut down, or the like, resulting in any cached passwords, keys, credentials, etc. are flushed 524 out of memory.

Figure 6:
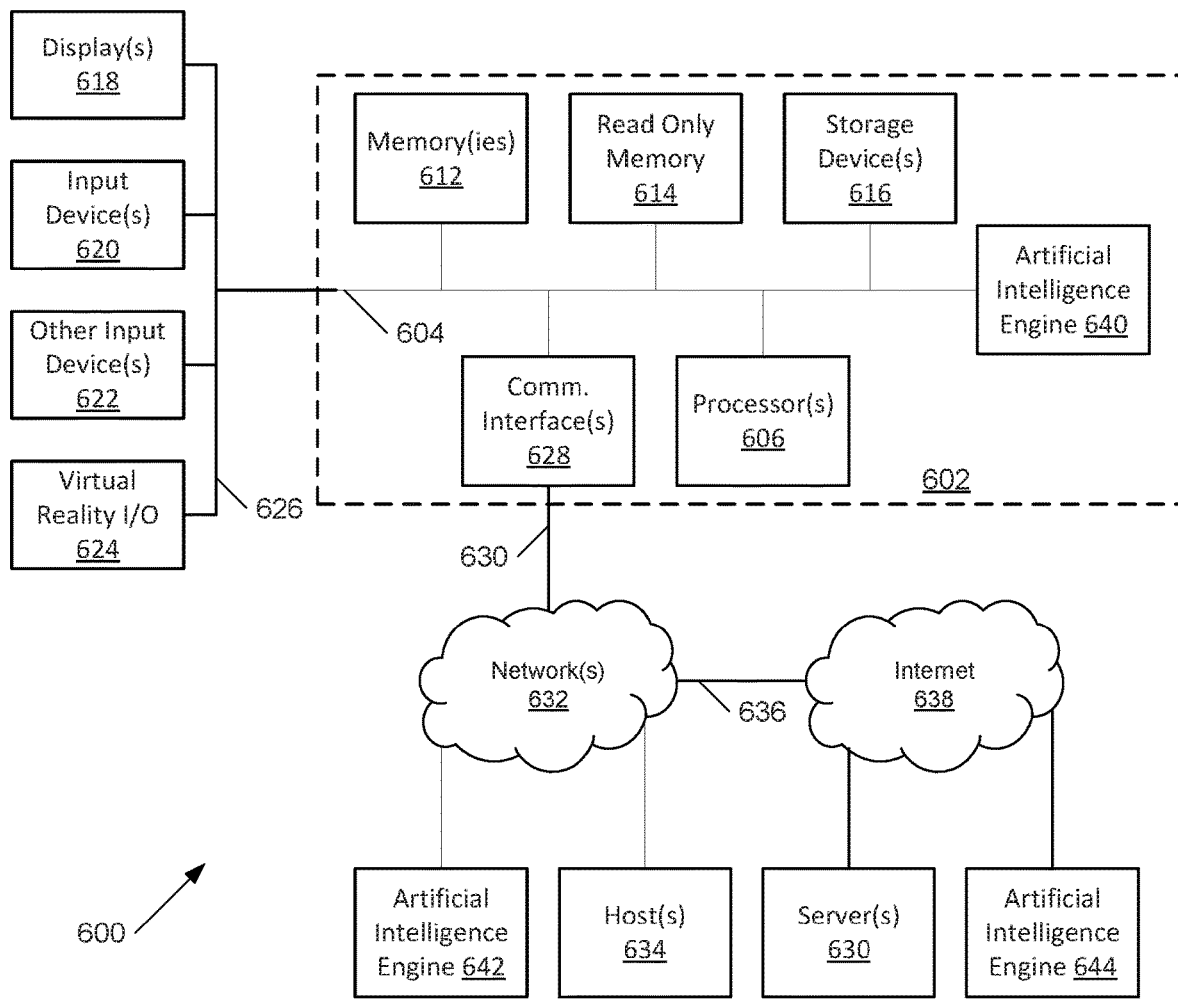
FIG. 6 illustrates an exemplary hardware environment according to one embodiment.

FIG. 6 illustrates an exemplary hardware environment 600 according to one embodiment. It will be appreciated the environment 600 may share features and characteristics discussed with respect to elements of FIGS. 1. Disclosed above are procedures, systems, methods, processes, and the like that may be implemented by one or more general purpose or specific purpose computing devices. Specific purpose computing devices may be hard-wired to perform the techniques, or may include digital electronic devices and operate in whole or in part under control of an application specific integrated circuit (ASIC), programmable gate array (PGA), field PGA (FPGA), or other fixed and/or programmable circuitry that may be persistently programmed to perform aspects of disclosed embodiments. General purpose and specific purpose devices may include program instructions in firmware, memory, or other storage, or a combination where if the instructions are executed by a processor implement aspects of the disclosed embodiments.

Specific purpose devices include by way of example only and not intended to be a limitation, desktop computer systems, portable computer systems, handheld devices, networking devices, telephones, tablets, transportation devices, or any other device that incorporates hard-wired and/or program logic to implement disclosed embodiments. General purpose devices, include by way of example only and not intended to be a limitation, a laptop (see, e.g., FIG. 3 item 342) or other machine that may execute an operating system and/or software to program to program functionality of the device. For example, illustrated is a computer system 602 upon which embodiments or portions of embodiments of the invention may be implemented. The computer system includes a bus 604 or other mechanism for communicating information within the computer system, and one or more processor(s) 606 coupled with the bus for processing information. The processor(s) may be, for example, a general purpose microprocessor, a custom processor, or other processor or collection of processors. It will be appreciated multiple processors may operate collectively as if as a single processor. Although the processor(s) are shown as all within the computer system, there may be other processors accessible over another bus (not shown), such as by way of an attached external enclosure containing processors. Additionally, information execution may be distributed across multiple processors accessible over one or more network(s) 608, e.g., internal networks within an environment including the computer system, and/or over the Internet 610.

The computer system 602 also includes a memory 612, e.g., a main memory, such as a random access memory (RAM) or other dynamic storage device, coupled to the bus 604 for storing information and instructions to be executed by the processor(s) 606. The main memory may also be used for storing temporary variables or other intermediate information during execution of instructions to be executed by the processor(s). Such instructions, when stored in non-transitory storage media accessible to the processor(s), render the computer system into a special-purpose machine that is device-specific to perform the operations specified in the instructions. The computer system may further include a read only memory (ROM) 614 or other static or non-volatile storage device coupled to the bus 604 for storing information or instructions for the processor(s). A storage device or devices 616, such as a magnetic disk, optical disk, or other storage media may be provided and coupled to the bus for storing information and instructions.

The computer system 602 may be coupled via the bus 604 to one or more output device(s), e.g., display(s) 618, such as a liquid crystal display (LCD), for displaying information to a computer user. A display may also include devices, such as Braille output devices, or other devices intended to facilitate presenting information to users that may benefit from sensory accommodation, such tactical and/or altered visual output for sight-impaired users. There may also be input devices 620, including alphanumeric and/or other keys, coupled to the bus for communicating information and command selections to the processor(s) 606. There may be other input devices 622, such as a mouse/tablet/trackball/cursor direction keys/Braille device, or other sensors including biometric devices to translate biometric information into input, for communicating direction information and command selections to the processor(s), and which may control, for example, cursor movement on the display(s). There may also be Virtual Reality Input/Output (I/O) 624 devices that may be used in addition to or in lieu of the other devices 618-622. It will be appreciated Virtual Reality may operate both as an information display of operation of the computer system, and also provide 2D and 3D input mechanisms, e.g., through movement of wands or other devices the virtual reality system monitors, as well as by visual monitoring and analysis of use movement, such as gesturing. The input and output devices 618-624 may communicate with the computer system over one or more communication pathways 626 that may interconnect these devices with the computer system. The computer system may be remotely controlled and not require direct user access.

The computer system 602 may implement the techniques described herein using device-specific hard-wired logic, one or more ASICs or FPGAs, firmware and/or program logic which in combination with the computer system causes or programs the computer system to be a special-purpose machine. As circuit technology continues to advance it is contemplated that disclosed embodiments may be presented with advancing technology. For example, quantum-state readout and measurement circuits for qubits, used in quantum computation devices, may be used to encode the processing and/or data storage aspects of disclosed embodiments. According to one embodiment, the techniques herein are performed by the computer system in response to the processor(s) 606 executing one or more sequences of one or more instructions contained in the memory 612. Such instructions may be read into the memory from another storage medium, such as from the storage device(s) 616. Execution of the sequences of instructions contained in the memory causes the processor(s) to perform the process steps described herein. In alternative embodiments, hard-wired circuitry may be used in place of or in combination with software instructions.

Storage media refers to any at least partially non-transitory media that may store data and/or instructions that cause a machine to operation in a specific fashion. Non-volatile media includes, for example, solid state disks (SSDs), optical or magnetic disks, etc. and may be used at the storage device(s) 616. Volatile media includes dynamic memory, such as the memory 612. There are many known volatile and/or non-volatile media memory and media formats that may be used to provide temporary or permanent storage. Storage media may be used in conjunction with transmission media. Transmission media participates in transferring information between storage media. For example, transmission media includes wireless and wired mediums, including the bus 604, modulated signals, acoustic waves, or light waves, such as those generated during radio-wave and infra-red data communications. It will be appreciated data may be optically encoded (e.g., represented as light packets), to encode instructions, data, and/or operational state of the computing system.

Various forms of media may be involved in carrying one or more sequences of one or more instructions to the processor(s) 606 for execution. For example, the instructions may initially be carried on storage of a remote computer. Assuming a similar configuration as the computer system 602, the remote computer can load the instructions into its memory and send the instructions over a communication pathway, which may be any form of wired or wireless communication medium. A corresponding receiving device local to the computer system may receive the data and convert the received information for placement on the bus 604. The bus may then carry the data to the memory 612, from which the processor(s) retrieves and executes the instructions. The instructions may be stored on the storage device(s) 616 before or after execution by the processor(s).

The computer system 602 includes a communication interface(s) 628 coupled to the bus 604. The communication interface(s) provides a two-way data communication coupling to a network 630 that is connected to a local network(s) 632. The communication interface(s) may include devices to communicate over a network such as by way of a local area network (LAN) or other network to provide a data communication connection for the computer system. Wireless links may be utilized. The communication interface(s) sends and receives signals in a format appropriate to the communication medium (e.g., electrical, electromagnetic, optical, etc.) that carry digital data streams representing various types of information. The communication interface(s) 628 allow a computer system to send and/or receive information through one or more network(s) to other data devices. For example, there may be a network link through the local network(s) to a host computer 634. There may be a link 636 that interconnects the local network(s) with the Internet 638, through which the computer system may communicate with another machine, such as one or more remote server(s) 640 which may send or receive requests to process data, retrieve and/or store information, etc.

In addition, various embodiments may employ Artificial Intelligence (AI) Engines (or "machine intelligence") to assist with operating, e.g., the management tool, devices being managed by the management tool, or other devices/machines as desired. It will be appreciated there are many different AI Engines that may be employed, such as neural networks (feedforward, recurrent, backpropagation, deep learning, etc.), expert systems, and many other analytical systems. It will be appreciated an AI Engine 640 may be incorporated into the computer system 602. However, since a robust AI Engine may require robust resources unavailable to certain computers, and AI Engine 642 may be available over a local network(s) 632 and/or an AI Engine 644 may be available as a remote resource accessible over, for example, the Internet 638. It will be appreciated one or more of the AI Engines 640-644 may cooperatively operate to analyze problems and suggest answers.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for a mobile device to collectively manage a collection of devices associated with an environment, the method comprising:
   receiving an identifier corresponding to a first device of the environment;
   automatically determining the collection of devices based at least in part on a search for the identifier in the environment;
   providing a temporary credential to a selected device of the collection of devices to enable reconfiguring the selected device;
   receiving an access key from the selected device in response to providing the temporary credential;
   caching the access key in a transitory memory;
   applying a new configuration to each of the devices in the collection of devices based at least in part on providing each of the devices its associated access key; and
   flushing the transitory memory.

2. The method of claim 1, in which the temporary credential includes an access authentication credential, the method further comprising:
   providing a second credential to a cloud service; and receiving a list of known devices including the collection of devices.

3. The method of claim 2, further comprising:
prompting for the second credential;
caching the second credential in the transitory memory; and
flushing the one or more key from the transitory memory.

4. The method of claim 1, in which determining the collection of devices comprises:
receiving a list of known devices; and
identifying active devices within the known devices.

5. The method of claim 4, in which the list of known devices includes an inactive device associated with the environment but disconnected from the environment, and the searching the environment comprises ignoring the inactive device.

6. The method of claim 1, in which the collection of devices are communicatively coupled to a network, and the identifier includes a network address for the first device.

7. The method of claim 1, in which the mobile device has an associated operator credential, the method further comprising:
determining whether the operator credential is authorized to provide the temporary credential.

8. The method of claim 1, in which the temporary credential is a login to the selected device and a cloud service has access to the identifier and is able to search for the identifier, the method further comprising:
receiving data corresponding to the collection of devices from the cloud service.

9. The method of claim 8 further comprising:
providing the temporary credential to each device in the collection of devices.

10. A computing system to collectively manage a collection of devices associated with an environment including devices, comprising:
at least one processor; and
a memory coupled to the at least one processor and storing instructions that, when executed by the at least one processor, cause the computing system to:
receive an identifier corresponding to a first device of the environment;
automatically determine the collection of devices based at least in part on a search for the identifier in the environment;
provide a temporary credential to a selected device of the collection of devices to enable reconfiguring the selected device;
receive an access key from the selected device in response to providing the temporary credential;
cache the access key in a transitory memory;
apply a new configuration to each of the devices in the collection of devices based at least in part on providing each of the devices its associated access key; and
flush the transitory memory.

11. The system of claim 10, in which the temporary credential includes an access authentication credential, wherein execution of the instructions cause the system to:
provide a second credential to a cloud service;
receive a list of known devices including the collection of devices;
cache the second credential in the transitory memory; and
flush the one or more key from the transitory memory.

12. The system of claim 11, in which the list of known devices includes an inactive device, and execution of the instructions cause the system to:
identify active devices within the known devices; and
exclude inactive devices within the known devices from the collection of devices.

13. The system of claim 10, wherein the system is to communicate over a network with the collection of devices, and the identifier is a network address for the first device.

14. The system of claim 10, in which the mobile device has an associated operator credential, and execution of the instructions cause the system to:
determine whether the operator credential is authorized to provide the temporary credential.

15. The system of claim 10, in which the temporary credential is a login to the selected device and a cloud service has access to the identifier and is operable to perform the search for the identifier, and execution of the instructions cause the system to:
receive data corresponding to the collection of devices from the cloud service.

16. A tangible computer readable medium having instructions stored thereon for managing a collection of devices associated with an environment including devices, that, in response to execution by a processor, the instructions are operable to cause a computing system to:
receive an identifier corresponding to a first device of the environment;
automatically determine the collection of devices based at least in part on a search for the identifier in the environment;
provide a temporary credential to a selected device of the collection of devices to enable reconfiguring the selected device;
receive an access key from the selected device in response to providing the temporary credential;
cache the access key in a transitory memory;
apply a new configuration to each of the devices in the collection of devices based at least in part on providing each of the devices its associated access key; and
flush the transitory memory.

17. The medium of claim 16, in which the temporary credential includes an access authentication credential, the list of known devices includes an inactive device, and execution of the instructions is to cause the computing system to:
provide a second credential to a cloud service;
receive a list of known devices including the collection of devices;
identify active devices within the known devices;
cache the second credential in the transitory memory; and
exclude inactive devices within the known devices from the collection of devices.

18. The medium of claim 16, in which the mobile device has an associated operator credential, and execution of the instructions is to cause the system to:
determine whether the operator credential is authorized to provide the temporary credential.

19. The medium of claim 16, in which the temporary credential is a login to the selected device and a cloud service has access to the identifier and is operable to perform the search for the identifier, and execution of the instructions is to cause the computing system to:
receive data corresponding to the collection of devices from the cloud service.

20. The medium of claim 19, wherein execution of the instructions is to cause the computing system to:
provide the temporary credential to each device in the collection of devices.

* * * * *